US006966466B2

(12) United States Patent
Jensen

(10) Patent No.: US 6,966,466 B2
(45) Date of Patent: Nov. 22, 2005

(54) ROTARY AIRLOCK VALVE

(75) Inventor: Arne Sloth Jensen, Lyngby (DK)

(73) Assignee: ASJ Holding APS, Lyngby (DK)

( * ) Notice: Subject to any disclaimer, the term of this patent is extended or adjusted under 35 U.S.C. 154(b) by 200 days.

(21) Appl. No.: 10/703,741

(22) Filed: Nov. 7, 2003

(65) Prior Publication Data

US 2005/0098586 A1  May 12, 2005

(51) Int. Cl.⁷ ............................................. G01F 11/10
(52) U.S. Cl. ...................................... 222/368; 414/219
(58) Field of Search ......................... 222/368; 414/219

(56) References Cited

U.S. PATENT DOCUMENTS

| 3,151,784 | A | | 10/1964 | Tailor |
| 3,195,241 | A | | 7/1965 | Hohne |
| 5,413,256 | A | * | 5/1995 | Mitchell et al. ............. 222/368 |
| 5,538,383 | A | * | 7/1996 | Ikeda et al. .................. 414/219 |
| 5,544,995 | A | * | 8/1996 | Ogawa et al. ............... 414/219 |
| 5,575,085 | A | | 11/1996 | Groombridge |
| 2003/0039515 | A1 | | 2/2003 | Salley, Jr. |

FOREIGN PATENT DOCUMENTS

GB     2 129 395 A     5/1984

* cited by examiner

*Primary Examiner*—Philippe Derakshani
(74) *Attorney, Agent, or Firm*—William J. Sapone; Henry Coleman; R. Neil Sudol

(57) ABSTRACT

A rotary airlock valve has a plurality of material receiving pockets having leading edges that are narrower than the trailing edges thereof, preferably having walls tapering inwardly so as to define a narrowed pocket opening for directing any material expansion due to pressurization to a center of a discharge outlet, to reduce wear and increase seal life.

7 Claims, 3 Drawing Sheets

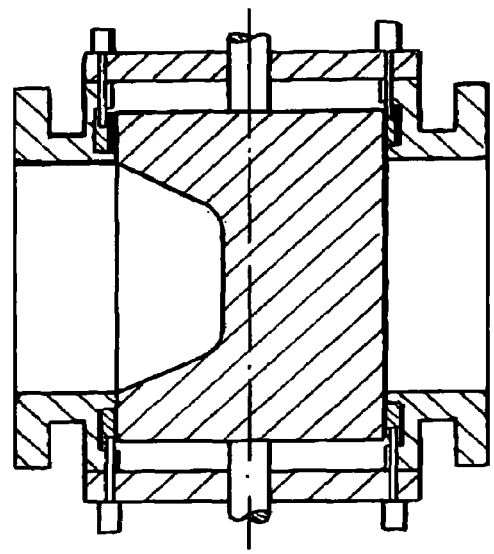
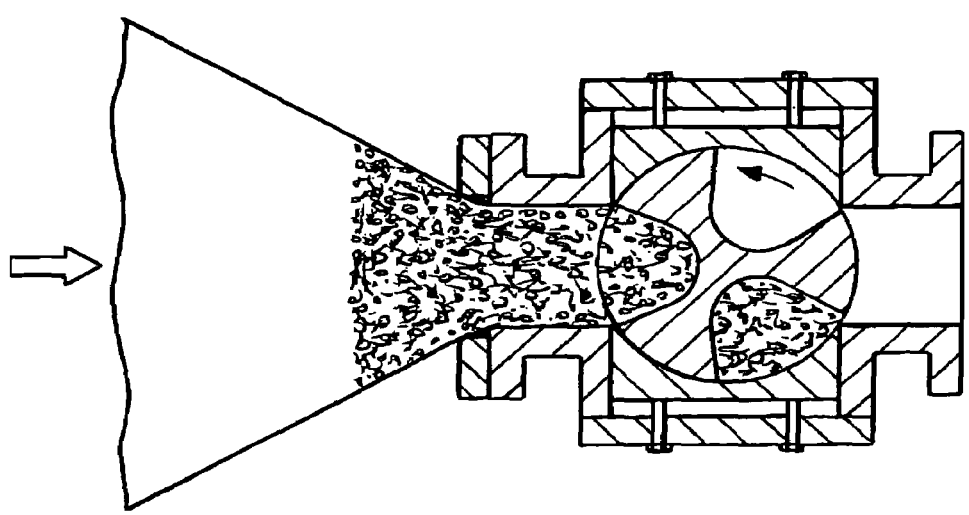
FIG.1b
FIG.1a

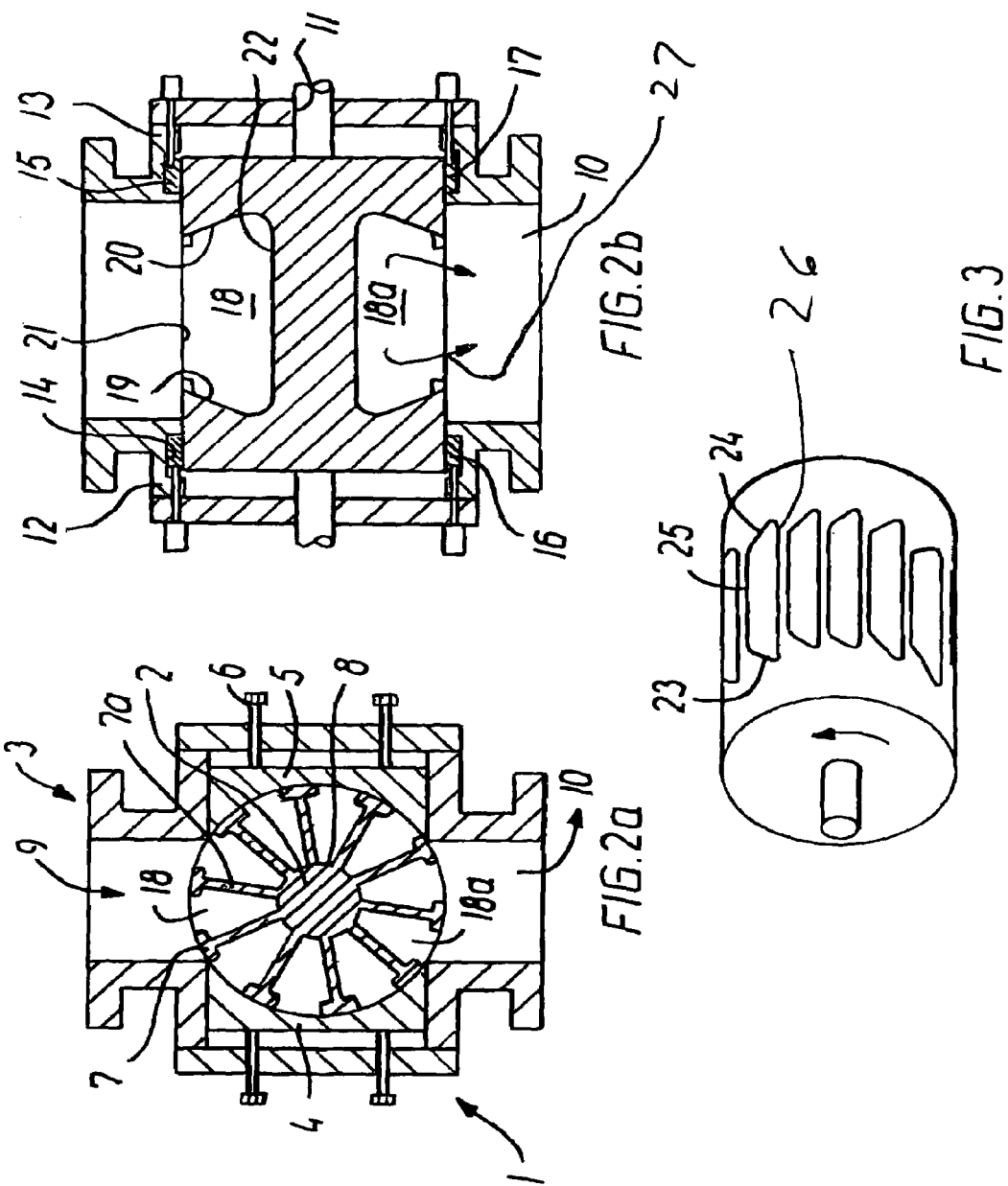

ROTARY AIRLOCK VALVE

TECHNICAL FIELD

This invention relates to a rotary airlock valve and more particularly to a rotary airlock valve for transferring a solid material from a high gas pressure entrance thereof to a low gas pressure discharge.

BACKGROUND

Rotary airlock valves are well known for use in the solids handling industry. Often, a solid material is transported to or received in a vessel using a pressurized gas such as air. The solid material accumulates in the vessel which remains under pressure. The typical way to remove the solid material is for it to collect in a discharge area or hopper which leads to an entrance of the rotary airlock valve.

A rotary airlock valve typically comprises a housing containing a cylindrical chamber within which is mounted an axially extending shaft. The shaft has a plurality of radially extending vanes or blade portions, with material receiving pockets defined between the vanes. As the shaft rotates, the outer edges of the vanes sealingly engage the inner surfaces of the cylindrical chamber wall. The rotary airlock valve typically has an upper inlet opening for receiving material, which falls into the receiving pockets between the vanes, as the shaft is rotated. There is also an outlet opening, typically on the bottom thereof, which allows the material to fall out of the material pockets, as each successively rotates into a discharge position. Between the inlet and outlet openings, the vanes defining the material receiving pockets are in sealing engagement with the chamber walls, to prevent any by-pass of pressurized gas from the inlet opening to the discharge opening. The rotary airlock valve thus prevents a direct connection between the inlet side, which may be under high pressure, and the outlet side which may be at a lower or atmospheric pressure. Thus, the airlock valve enables transfer of solid material from the pressurized vessel, to a conveyor or other vessel at a lower pressure, at pressure differences possibly on the order of 5 to 50 mbars.

In some applications, such as when drying a solid material, such as finely divided biological materials i.e., wood pulp, sugar beet pulp or sugar cane pulp, steam may be used with the product to be transferred. For example, in the manufacture of paper pulp, wood chips are fed to a hopper at up to 12 bars pressure, the chips then fed through the airlock valve to a digester. FIGS. 1a and 1b are views of such a rotary airlock valve. The rotary air lock in that case is typically designed to have a rotor having a minimum number of large material receiving pockets, with a large sealing surface in between the pockets, owing to the high pressure differential. These airlock valves also may be provided with adjustable cylinder walls that can be moved to improve the seal between the rotor vanes and the cylinder walls.

However, there are problems with rotary airlock valves in such an application, particularly due to wear. Whenever solids transfer occurs, there is a potential for the sealing surfaces to wear, resulting in gas by-pass around the rotary air valve. This is a particularly serious problem when handling pulp, as this may contain sand, which is quite abrasive. Also, the rotary airlock valve typically includes a seal or gasket between the rotating vanes and the static housing portions, and any solids incursion can lead to rapid wear, that can result in gas leaks outside of the housing. When such leakage occurs, the system must be shut down, resulting in costly processing delays. Typically, such rotary airlock valves have a very limited life in the harsh pulp service described above, of about two months.

This problem is particularly acute when the rotary airlock valve transfers a dried solid material from a pressure of about 2.5 bar, to atmospheric pressure, with superheated steam being the pressurizing gas. As the shaft rotates to the discharge opening, the initial breach to the low pressure side causes a strong outflow of steam, causing the dried material be accelerated as it is driven out of the pocket, at velocities of up to 300 meters per second, increasing the abrasive effect and wear on the adjacent parts, particularly the edge of the opening. In addition, the flashing of the steam from the pocket can cause condensation and wetting of the powder material or adjacent surfaces, that may lead to product accumulation.

With each successive turn of the room, the expansion effect increases due to a wearing of the sealing surfaces, eventually resulting in a gas by-pass around the valve.

SUMMARY OF THE INVENTION

It is an object of the present invention to provide a rotary airlock valve with reduced wear characteristics.

It is a further object of the present invention to provide a rotary airlock valve that can readily handle steam expansion effects without increased wear.

These and other objects of the present invention are achieved by a rotary airlock valve comprising:

a housing having an inlet opening and an outlet opening;

a rotor disposed in the housing and being rotatable therein;

a plurality of vanes radially extending from the rotor defining a plurality of material receiving pockets therebetween, each pocket having a forward or leading edge, and a trailing edge, the forward edge being narrower in width than the trailing edge, to form an outwardly tapering pocket.

By outwardly narrowing the forward edge, and then expanding to a wider trailing edge, any expansion of gas or particle acceleration is directed by the narrow forward edge away from the side edges of the housing, to reduce the wear effects on the housing walls and associated seals. Once the pressure is depleted, the wider trailing edge assures that all the material in the pocket is discharged.

In another embodiment, the pockets have side walls converging from an inner end to an outer end thereof, to add tapering to the entire pocket. In yet another embodiment, the leading edges of each pocket are displaced slightly relative to each other, for example starting close to a first side of the housing and moving in staggered increments across the width of the cylinder to distribute the wear effects across the entire width of the cylinder, while still obtaining the benefit of the narrowed forward edge design. In this way, the life of the rotary airlock valve can be extended even further.

Preferably, multiple small chambers are defined by the vanes as opposed to a few large chambers, as this further reduces the quantity of captured steam within any one pocket. Preferably, more than 6 pockets are provided, most preferably about 7 to 12 pockets are used. The forward edge preferably has a width that is about 50 to 80% of the width of the cylinder, the trailing edge having a width of from 75 to 100% of the width of the cylinder. Also, The taper angle of the side walls of the pocket can vary and is preferably an angle greater than 2 degrees of the circle of the revolution.

BRIEF DESCRIPTION OF THE DRAWINGS

FIGS. 1a and 1b are views of a prior art rotary airlock valve.

FIG. 2a is a view of the rotary air lock of the present invention, FIG. 2b being a cross-sectional view taken along line B—B thereof FIG. 3 is a perspective view of a rotor in accordance with the present invention.

DETAILED DESCRIPTION OF THE INVENTION

Figure 4A:
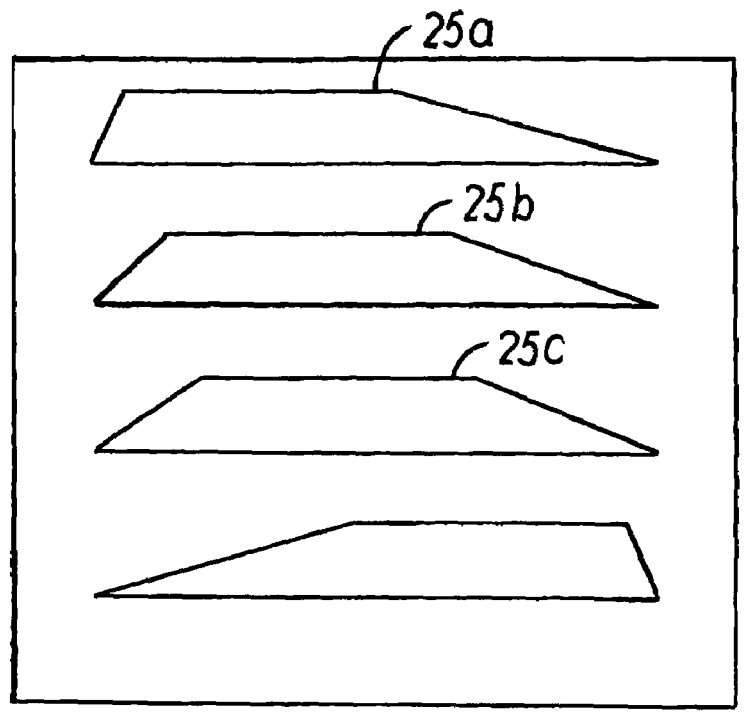
FIGS. 4A and 4B are alternative embodiments of the present invention.

Referring to FIG. 2a, a rotary airlock valve 1 has a rotor 2 disposed in a housing 3 having a pair of movable cylindrical sealing walls 4 and 5. These are adjusted by screws 6 to assure a positive seal with vanes 7 that extend from a hub 8 of the rotor. The housing has an inlet opening 9 and an outlet opening 10. Referring to FIG. 2b, the rotor is mounted to a shaft 11, driven for rotation by a motor (not shown). The housing has a side sections 12 and 13, each having a circumference groove 14 and 15 that receive a sealing material or gasket 16 and 17 therein. The sealing material may be a gasket, a compressible packing, or any other conventional seal commonly used to seal such rotating parts.

In FIG. 2b, a material receiving pocket 18 is shown adjacent the inlet opening for receiving a solid material therein. The pocket shape is defined by the adjacent vanes, 7 and 7a, and has converging side walls 19 and 20 such that the pocket opening 21 is of smaller cross-section than a pocket bottom 22. Preferably, these are inclined from the narrower forward edge to the wider trailing edge, to provide even emptying after the pressure is relieved. In this embodiment, upper edges 23 and 24, shown in FIG. 3, are tapered inwardly, in a direction of rotation of the rotor, providing a forward or leading edge 25 having a narrower width than a width of the outlet opening, while the trailing or rearward edge 26 has a width corresponding to the width of the outlet opening.

It is preferred to utilize a larger number of smaller pockets, as the reduction in volume per pocket has an inherent damping effect on the pressurized discharge discussed above, and at least 7 pockets, more preferably 7 to 12 pockets should be used.

The forward edge preferably has a width that is about 50 to 80% of the width of the outlet opening, the trailing edge having a width of from 70 to 100% of the width of the outlet opening.

A pocket 18a is shown adjacent the discharge opening 10. As is indicated by the arrows 27, any gas expansion or particle acceleration is directed to the center of the opening, along the leading edge 25, gradually expanding as the rotor continues to advance in the direction of rotation. By breaching substantially in the middle of the outlet opening, instead of across the entire width on the opening, the initial expansion effect occurs away from the side sealing areas, significantly reducing the capability to cause wear or leakage.

Preferably, the pocket has correspondingly tapered walls so that a leading wall associated with the leading edge is smaller than a trailing wall associated with the trailing edge 26, as well as having converging side walls, as these will also lead the material and expanding gas to a central portion of the outlet opening on discharge, which also assists in preventing clogging as the pulse of expanding gas is directed to the center of the outlet. Optionally combining the pocket design with an increased number of smaller chambers further dampens the expansion effect, minimizing wear and thus prolonging the periods between maintenance shutdowns.

Figure 4B:
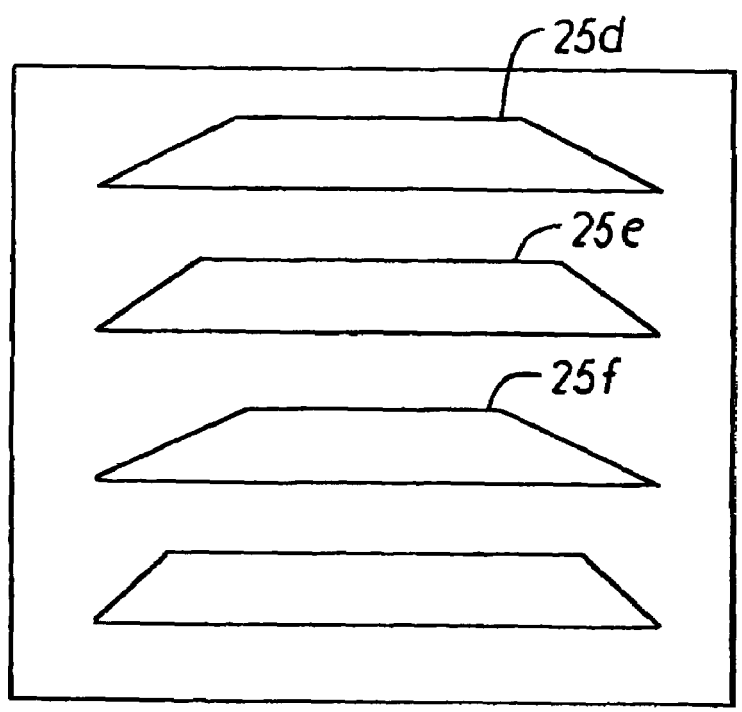

In another embodiment shown in FIG. 4A, the pockets can be staggered in terms of the position of the leading edge, relative to each other so that the wear is not concentrated always on the same part of the outlet opening. For example, a first leading edge 25a is disposed towards one side of the outlet opening, a second leading edge 25b disposed sightly inboard thereof, a third leading edge disposed centrally relative to the outlet opening, etc. In this way, each pocket has a slightly different wear effect, but the cumulative effect is to distribute the wear across the entire width of the outlet opening, while still having the advantage of directing the initial pressure pulse away from the housing seals. Of course, the order of these can be varied, and they need not proceed in such a staggered arrangement, and a more random distribution may be best. Further, the widths themselves can vary, from leading edge to leading edge for the same reason, to distribute, and thus dampen the wear effects to increase the operational life of the rotary airlock valve. For example, referring to FIG. 4B, a first leading edge 25d can have a 50% width, the next leading edge being 80%, the next 25f being 65%, etc. Of course, the arrangement can be determined by one skilled in the art, and tailored to the particular apparatus and material being discharged, so that more of these features are used in the more severe applications and possibly less in those which are less severe.

While particular embodiments of this invention have been shown and described, it will be understood by those skilled in the art that the invention is not limited thereto and that many changes and modifications can be made, and the invention is intended to include any such modifications as will fall within the spirit and scope of the appended claims.

What is claimed is:

1. A rotary airlock valve comprising:
   a housing having an inlet opening and an outlet opening;
   a rotor disposed in the housing and being rotatable therein;
   a plurality of vanes radially extending from the rotor to define a plurality of material receiving pockets therebetween, each pocket having a forward or leading edge in the direction of rotation which is narrower that a trailing edge of the pocket, to define a narrowed pocket opening such that pressurized material discharged from the chamber is directed substantially to a center of the outlet openings.

2. The rotary airlock valve of claim 1 wherein the plurality of vanes define from 7 to 12 pockets.

3. The rotary airlock valve of claim 1 wherein each pocket has walls which converge from an inner end to an outer end thereof, preferably converging at an angle of from about 2 to 20 degrees.

4. The rotary airlock valve of claim 1 wherein the housing has opposing sides, each side having sealing means therein engagable with sealing edges of the vanes.

5. The rotary airlock valve of claim 1 wherein each pocket opening has a leading edge having a width of about 50 to 80% of a width of an outlet opening, and a trailing edge having a width of about 75 to 100% of the width of the outlet opening.

6. The rotary airlock valve of claim 1 wherein the rotary airlock valve has a plurality of leading edges, at least two or more of the leading edges disposed in different positions across the width of the outlet opening relative to each other.

7. The rotary airlock valve of claim 1 wherein the rotary airlock valve has a plurality of leading edges, at least two or more of the leading edges being of different widths.

* * * * *